US012571760B2

(12) United States Patent
Speck et al.

(10) Patent No.: US 12,571,760 B2
(45) Date of Patent: Mar. 10, 2026

(54) METHOD OF MANUFACTURING A SENSOR ELEMENT

(71) Applicant: Endress+Hauser Conducta GmbH+Co. KG, Gerlingen (DE)

(72) Inventors: Matthäus Speck, Göpfersdorf (DE); Hans Wagler, Leisnig (DE); Thomas Wilhelm, Chemnitz (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 274 days.

(21) Appl. No.: 18/535,576

(22) Filed: Dec. 11, 2023

(65) Prior Publication Data

US 2024/0201122 A1     Jun. 20, 2024

(30) Foreign Application Priority Data

Dec. 19, 2022    (DE) ...................... 10 2022 133 828.2

(51) Int. Cl.
*G01N 27/333*        (2006.01)
*G01N 27/30*         (2006.01)
(Continued)

(52) U.S. Cl.
CPC ......... *G01N 27/333* (2013.01); *G01N 27/302* (2013.01); *G01N 27/4035* (2013.01); *G01N 27/4167* (2013.01)

(58) Field of Classification Search
CPC ............... G01N 27/333; G01N 27/302; G01N 27/4035; G01N 27/4167; C03C 4/18
See application file for complete search history.

(56) References Cited

U.S. PATENT DOCUMENTS 3,718,569 A  *  2/1973  Petersen ................ G01N 27/36
                                                          65/59.27
4,133,735 A     1/1979  Afromowitz et al.
                                (Continued)

FOREIGN PATENT DOCUMENTS

DE          2220841 A1    11/1972
DE          2050050 B2     4/1973
                    (Continued)

OTHER PUBLICATIONS

Brass, http://en.wikipedia.org/wiki/Brass, last accessed Nov. 20, 2023.

*Primary Examiner* — Alexander S Noguerola
(74) *Attorney, Agent, or Firm* — Christopher R. Powers; Endress+Hauser (USA) Holding, Inc.

(57)        ABSTRACT

A method for manufacturing a sensor element for a potentiometric sensor includes: forming a glass layer made of an electrically insulating glass on a surface of a base body, in particular a base body made from an electrically insulating material; arranging a substrate made of copper or a copper-based alloy having a mass fraction of at least 60% copper on the glass layer; covering the substrate arranged on the glass layer with a glass body, for example a glass plate, made of an ion-selective, in particular pH-selective, glass; and subsequently controlling the temperature of the arrangement of the base body, substrate and glass body thus formed in such a way that the substrate is integrally bonded to the glass body made of the ion-selective glass and the glass layer on the surface of the base body.

20 Claims, 1 Drawing Sheet

(51) Int. Cl.
    *G01N 27/403*      (2006.01)
    *G01N 27/416*      (2006.01)

(56)            References Cited

U.S. PATENT DOCUMENTS

| | | | | |
|---|---|---|---|---|
| 2019/0234899 | A1* | 8/2019 | Limon Petersen | .. G01N 27/302 |
| 2021/0055252 | A1* | 2/2021 | Wilhelm | ................ C03C 27/02 |

FOREIGN PATENT DOCUMENTS

| | | | |
|---|---|---|---|
| DE | 1291139 | B | 1/1974 |
| DE | 3607522 | A1 | 10/1986 |
| DE | 19714474 | A1 | 10/1998 |
| DE | 102009007851 | A1 | 8/2010 |
| DE | 102011118409 | A1 | 5/2013 |
| DE | 102012007854 | A1 | 10/2013 |
| DE | 102013101420 | A1 | 8/2014 |
| DE | 102015121364 | A1 | 6/2017 |
| DE | 102016202083 | A1 | 8/2017 |
| DE | 102016005943 | A1 | 11/2017 |
| DE | 102017126130 | A1 | 5/2019 |
| DE | 102017127656 | A1 | 5/2019 |
| DE | 102019108890 | A1 | 10/2019 |
| DE | 102019133789 | A1 | 6/2021 |
| WO | 2021032734 | A1 | 2/2021 |

* cited by examiner

METHOD OF MANUFACTURING A SENSOR ELEMENT

CROSS-REFERENCE TO RELATED APPLICATION

The present application is related to and claims the priority benefit of German Patent Application No. 10 2022 133 828.2, filed Dec. 19, 2022, the entire contents of which are incorporated herein by reference.

TECHNICAL FIELD

The present disclosure relates to a sensor element for a potentiometric sensor and to a method for producing a sensor element for a potentiometric sensor.

BACKGROUND

Potentiometric sensors are used in laboratory and process measurement technology in many areas of chemistry, bio-chemistry, pharmacy, biotechnology, food technology, water management and environmental measurement technology for the analysis of measured liquids. Potentiometric sensors allow detection of activities of chemical substances, such as ion activities, and correlated measured variables, such as concentrations or the pH value, in liquids. The substance, the activity or concentration of which is to be measured, is also referred to as an analyte. The measured liquid can be, for example, an aqueous solution, emulsion or suspension.

Potentiometric sensors generally comprise a measuring electrode and a reference electrode as well as a sensor circuit for detecting measured values and for signal processing. The measuring and reference electrodes can be combined in a measuring probe that can be immersed in the measuring fluid. This measuring probe can also comprise the sensor circuit or at least part of the sensor circuit. The measuring probe can be connected for communication to a higher-level unit, for example, a measuring transducer, an electronic operating device, a computer, or a controller, via a cable or wirelessly. The higher-level unit can be used for further processing the measurement signals or measured values detected by means of the measuring probe and for operating the measuring probe.

In contact with the measured liquid, the measuring electrode forms a potential that is dependent on the activity of the analyte in the measured liquid, whereas the reference electrode provides a stable reference potential that is independent of the analyte concentration. The sensor circuit generates an analog or digital measurement signal which represents the electric voltage between the measuring electrode and the reference electrode and, consequently, the activity of the analyte in the measuring medium. The measurement signal may be output from the sensor circuit to the higher-level unit, which further processes the measurement signal. A partial or complete further processing of the measurement signal in the sensor circuit in the measuring probe is also possible.

The reference electrode of conventional potentiometric sensors is often designed as a second-type electrode, e.g., as a silver/silver chloride reference electrode, and is electrically conductively connected to the sensor circuit. It can comprise a housing and a reference element, e.g., a silver wire coated with silver chloride, which is arranged in the housing and which is in electrolytically conductive and/or ion-conducting contact with the measuring fluid during measuring operation via a reference electrolyte arranged in the housing and an electrochemical bridge, e.g., a diaphragm.

The measuring electrode comprises a potential-forming sensor element which comprises an ion-selective membrane, depending upon the type of the potentiometric sensor. Examples of such measuring electrodes are ion-selective electrodes. A conventional ion-selective electrode has a housing that is closed by the ion-selective membrane and accommodates a liquid inner electrolyte that is in contact with the membrane. Furthermore, an ion selective electrode comprises an electrically conductive terminal lead, for example, a silver wire coated with silver chloride, which is in contact with the inner electrolyte. The terminal lead is electrically conductively connected to the sensor circuit.

When the ion-selective membrane for measuring is in contact with the measuring liquid, the membrane selectively interacts with a certain ionic species contained in the measuring liquid, namely with the analyte. Changing the activity or concentration of the analyte in the measured liquid causes a relative change in the equilibrium galvanic voltage between the measured liquid and the terminal lead in contact with the ion-selective membrane via the inner electrolyte. A special case of such an ion-selective electrode, i.e., an electrode that selectively detects the hydronium ion activity in a measuring liquid, is the known pH glass electrode, which comprises a glass membrane as the potential-forming sensor element.

The terms "ion-selective layer," "membrane," or "electrode" used here and hereinafter refer to an ion-sensitive layer, membrane, or electrode, the potential of which is preferably predominantly influenced by the analyte, e.g., a specific ion type or the pH value, wherein cross-sensitivities of the layer, membrane, or electrode for other types of ions are not excluded but are preferably low. The term "ion-selective glass" refers to a glass which is suitable for forming such an ion-selective layer, membrane, or electrode.

It has long been attempted to improve the design of measuring electrodes of potentiometric sensors with the goal of saving costs, simplifying manufacture, and greater robustness and longer service life. One approach that has been tried again and again is the use of a solid terminal lead, which does not require a liquid inner electrolyte that contacts the ion-selective membrane.

A pH sensor is known from DE 10 2016 202 083 A1 which has a terminal electrode, which comprises a metal reference electrode as a metal solid terminal lead and a pH-sensitive glass membrane made of lithium-silicate glass applied to the reference electrode, and further has a contact region made of a contact metal, e.g., copper, that forms monovalent metal cations on the outside of the metal reference electrode. The glass membrane is doped with the monovalent metal cations from the contact region of the reference electrode in such a way that a defined sensor potential is formed.

DE 1291139 B describes a glass electrode which has a terminal electrode made of metal, preferably copper. The terminal electrode has an oxide skin on the surface, onto which a pH-selective glass layer is melted.

U.S. Pat. No. 4,133,735 A describes glass electrodes having a solid terminal lead, which have a conductor with a surface layer made of an electrochemically active material, e.g., copper. This surface layer has a first coating made of a mixture of glass and a halide of the active metal. An ion-selective glass coating is applied to this first coating by dipping the conductor into an ion-sensitive glass melt.

WO 2021/032734 A1 describes a sensor element which has a substrate made of copper or a copper-based alloy having a mass fraction of at least 60% copper and to which an ion-selective enamel layer is applied. The substrate can be arranged on a metal or ceramic carrier body. WO 2021/ 032734 A1 also specifies a method for producing such a sensor element. The method comprises conditioning a substrate formed from copper or a copper-based alloy, having a mass fraction of at least 60% to generate an oxide layer containing monovalent copper, and applying an ion-selective enamel layer to the conditioned substrate. The enamel layer can be applied by placing a glass body made of the ion-selective glass onto the substrate, which can be arranged on said carrier body, and melting the glass body onto the substrate to form the enamel layer.

Enameling substrates to produce ion-selective glass electrodes is a fundamentally promising approach. Sensor elements having a planar geometry are particularly interesting with regard to the miniaturization of ion-selective electrodes and/or pH electrodes. On account of the comparatively high temperatures in conventional enameling processes, however, it is very difficult to produce planar sensor elements. The production of a sensor element described in WO 2021/ 032734 A1 by melting a glass body onto a metal substrate is satisfactory in many cases, but in practice, depending on the substrate or, if applicable, the carrier body used on which the substrate is arranged, it can lead to rejects due to insufficient adhesion or interlocking of the glass body to or with the substrate or the carrier body. A susceptibility to mechanical damage, for example, chipping of the glass layer under impact loads, can also be observed in the sensor elements thus produced.

SUMMARY

The object of the present disclosure is therefore to provide planar sensor elements for ion-selective electrodes or pH electrodes that are improved with regard to their mechanical stability and an improved method for producing planar sensor elements.

The object is achieved by a method and by the sensor element according to the present disclosure.

The method according to the present disclosure for producing a sensor element for a potentiometric sensor comprises the following steps:

forming a glass layer made of an electrically insulating glass on a surface of a base body, in particular a base body made from an electrically insulating material;

arranging a substrate made of copper or a copper-based alloy having a mass fraction of at least 60% copper on the glass layer;

covering the substrate arranged on the glass layer with a glass body, for example a glass plate, made of an ion-selective glass; and subsequently controlling the temperature of the arrangement of the base body, substrate and glass body thus formed in such a way that the substrate is integrally bonded to the glass body made of the ion-selective glass and the glass layer on the surface of the base body.

When controlling the temperature, the substrate is enamel bonded on both sides and is thus integrally bonded on one side to the glass layer previously applied to the base body and to the glass body on the opposite side. It is found that this prevents the substrate from slipping on the glass layer. While in the method known from WO 2021/032734 Al, in which a glass body completely covering the substrate is melted onto the substrate and an underlying carrier body, wetting problems can occur at the interface between the glass body and the carrier body in the edge region of the substrate, in the present case the glass body is melted onto the substrate and, in the edge region of the substrate, is melted onto the glass layer with which the base body is coated. Possible wetting problems of the ion-selective glass of the glass body on the base body are therefore unable to occur. This allows for the reproducible and more robust production of a planar sensor element.

The ion-selective glass can be a pH-selective glass, for example.

The base body can be formed from an electrically insulating ceramic and/or glass cermic.

The substrate can be formed from a foil made of copper or the copper-based alloy.

The method can further comprise generating an oxide layer on a surface of the substrate, which is intended for connection to the glass body made of the ion-selective glass, by a thermal pretreatment process, a plasma pretreatment process, an electrochemical or chemical reaction in solution or by applying the oxide layer from the gas phase by means of a coating process.

When controlling the temperature, the temperature may be selected to be greater than 600° C. and lower than 1050° C., preferably greater than 750° C. and lower than 900° C. The temperature should not exceed the melting temperature of the substrate and should not fall below the transformation range of the ion-selective glass.

Advantageously, the substrate can be electrically conductively connected to a contact point on the rear side of the base body facing away from the substrate. For example, the base body can have a through-opening which extends from the surface of the base body on which the substrate is arranged to a side of the base body facing away from this surface, wherein the method further comprises introducing an electrical conductor into the through-opening and placing the substrate in electrical contact with the electrical conductor.

The sensor element according to the present disclosure for a potentiometric sensor, which can be produced by the method described above, comprises:

a substrate made of copper or a copper-based alloy having a mass fraction of at least 60% copper;

a layer of an ion-selective, in particular pH-selective, glass arranged on a first side of the substrate; and a base body, wherein an electrically insulating glass layer is arranged on a second side of the substrate facing away from the first side of the substrate as an intermediate layer between the substrate and the base body.

By providing an electrically insulating glass layer as an intermediate layer between the substrate and the base body, irregularities of the sensor element caused by wetting phenomena during production are avoided or at least reduced. A smooth and flat surface of the side of the sensor element facing the measuring medium can be achieved by the intermediate layer, specifically irrespective of the surface condition of the base body. This is particularly advantageous for the use of the sensor element in applications with strict hygiene requirements, e.g., in food or pharmaceutical processes.

The base body can be made from an electrically insulating material. For example, an electrically insulating ceramic or an electrically insulating glass ceramic, for example made of zirconium oxide, yttrium oxide-stabilized zirconium oxide or aluminum oxide, is possible for this purpose.

The substrate can be electrically conductively connected to a terminal which is arranged on a rear side of the base body facing away from the substrate.

The base body can have an opening which extends through the base body and in which an electrical conductor is arranged which electrically contacts the substrate. In a first possible embodiment, the electrically insulating glass layer can also have an opening which is aligned with the opening in the base body and through which the electrical conductor contacts the substrate. Alternatively, the glass layer can cover the opening in the base body and have an increased degree of electrical conductivity in its region covering the opening in the base body. This can be achieved, for example, by means of local doping and/or by means of one or more additives present locally in the glass which increase the degree of electrical conductivity. In this case, the substrate is contacted by the electrical conductor arranged in the opening in the base body via the electrically conductive region in the otherwise insulating glass layer.

The substrate can be made from a foil made of copper or the copper-based alloy.

The layer made of the ion-selective glass can be doped at least with $Cu^+$ ions, i.e., Cu(I), at least in a region of the layer adjacent to the substrate.

The electrically insulating glass layer can be formed from a substantially pH-insensitive glass. Possible pH-insensitive glasses are, for example, silicate glasses containing aluminum oxide and/or oxides of a plurality of different alkali metals.

The present disclosure also relates to a potentiometric sensor for measuring an ion concentration or a pH of a measured liquid, comprising:

a sensor element according to any of the embodiments described above;

a reference electrode;

and a sensor circuit which is electrically conductively connected to the sensor element and to the reference electrode and which is designed to detect a potential difference between the sensor element and the reference electrode.

The sensor circuit can further be configured to output a measurement signal representing the detected potential difference. The potential difference is a measure of the activity of ions which influence the potential of the sensor element serving as the measuring electrode of the potentiometric sensor. It is therefore a measure of the analyte concentration or, if the sensor element has a pH-selective glass layer, of the pH of a measuring liquid which is brought into contact with the sensor element and the reference electrode for measurement purposes.

BRIEF DESCRIPTION OF THE DRAWINGS

In the following, the present disclosure is explained on the basis of the exemplary embodiments shown in the figures. The same reference signs refer to the same components of the components shown in the figures. In the figures.

DETAILED DESCRIPTION

Figure 1:
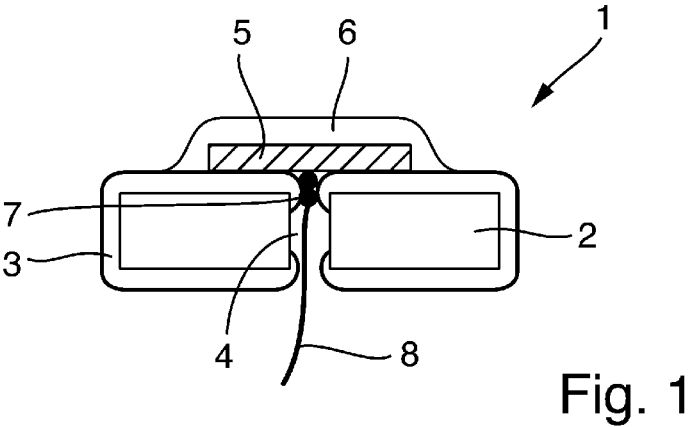
FIG. 1 shows a cross-sectional view of a planar sensor element for measuring pH according to the present disclosure.

FIG. 1 schematically shows a sensor element 1 for potentiometric pH measurements in longitudinal section according to the present disclosure. The sensor element 1 has a base body 2 made of a ceramic or glass ceramic, which in the present example is designed as a circular disk having a central through-opening 4. In principle, however, the base body 2 can have a variety of other geometries. A glass layer 3 made of an electrically insulating glass is applied to the base body 2. The electrically insulating glass is preferably pH-insensitive. With silicate glasses, pH-insensitive can be achieved, for example, by the glass containing a proportion of aluminum oxide $Al_2O_3$ or by adding a plurality of different alkali metal oxides, e.g., $Li_2O$ or $Na_2O$. In the present example, the glass layer 3 covers the entire base body 2 except for the opening 4, so that the opening 4 also extends through the insulating glass layer 3. It is also possible for the glass layer 3 to only cover one side of the base body 2 and for the opposite side of the base body 2 to remain uncovered. At least part of the circumferential lateral surface of the circular disk-shaped base body 2 can also be covered by the glass layer 3.

A substrate 5 is arranged on the glass layer 3 above the opening 4, which, in the present example, is designed as a foil made of copper or a copper-based alloy. The foil or the substrate 5 is integrally bonded to the glass layer 3. The substrate 5 is covered by a further layer 6 made of a pH-selective glass. The pH-selective glass can be a silicate glass containing lithium oxide, for example. The layer thicknesses are exaggerated in FIG. 1 for the sake of clarity. The substrate 5 has a thickness of between 10 and 20 μm, for example. Typical thicknesses of the insulating glass layer 3 and the ion-selective glass layer 6 are 50 μm to 1000 μm.

The surface region of the base body 2 on which the substrate 5 is arranged can have an area of 0.5 to 1 $cm^2$.

On its rear side facing the base body 2, the substrate 5 is electrically contacted via a contact point 7 by an electrical conductor 8 guided through the opening 4. The electrical conductor 8 can be a metal wire, as shown schematically here. However, the conductor 8 can also be designed as an electrically conductive coating and/or as a via feedthrough within the opening 4. The electrical conductor 8 can connect the substrate 5 to a sensor circuit, which can be designed to detect a potential of the sensor element 1, which is in contact with a measuring liquid, against a stable reference potential.

The sensor element 1 can be produced in the following manner: first, a base body 2 is coated with a highly insulating and hydrolytically resistant glass layer 3, for example, at a temperature of 1000° C. The base body 2 can be formed, for example, from zirconium oxide or yttrium-stabilized zirconium oxide (Y-TZP). As in the example mentioned above, the base body 2 can be circular disk-shaped and have a through-opening 4 which extends between two opposite surfaces of the base body 2. When coated with the insulating glass 3, the opening 4 remains free. If glass 3 enters the opening 4 during the coating process and closes it, through-opening 4 can be opened again in a subsequent post-processing step, for example, by means of mechanical and/or thermal post-processing, for example, by means of a drilling tool or a laser. Alternatively, an etching process or a sputtering process is also possible.

A metal foil made of copper or a copper-based alloy, for example, tombac, which serves as a substrate 5 for the sensor element 1, is placed on the insulating glass layer 3 formed by the coating with glass and is covered with a further glass body 6, for example, a glass plate, made of an ion-selective, for example pH-selective, glass. The temperature of the resulting stack of the glass-coated base body 2, substrate 5 and glass body 6 is then controlled in an oven at approximately 800° C. The metal foil forming the substrate 5 is enameled or enamel-bonded on both sides so that the insulating glass layer 3 on the base body 2, the substrate 5 and the glass plate 6 made of the ion-selective glass are integrally bonded to one another. As a result, the layer sequence consisting of the insulating glass layer 3, substrate 5 and ion-selective glass layer 6 of the sensor element 1 shown in FIG. 1 is thus produced. This method prevents the metal foil from slipping on the base body 2. Possible wetting problems of the pH glass body 6 covering the substrate 5 overlapping the surface of the base body 2 during the enamel bonding process can thus be minimized. By means of the insulating glass layer 3 applied to the base body 2 prior to the enamel bonding process, a hygienically smooth surface of the surface of the sensor element 1 which is in contact with the measuring liquid during measurement operation can be achieved irrespective of the surface condition of the base body 2.

In order to electrically contact the substrate 5, an electrical conductor 8 is guided through the opening 4 in the base body 2 and is electrically conductively connected via a contact point 7, for example, made of soldering tin or soldering paste, to the rear side of the substrate 5 covering the opening 4. Alternatively, the inside of the opening 4 can be coated with an electrically conductive material and the resulting coating can be electrically conductively connected to the substrate 5.

Optionally, the substrate 5 can be conditioned, for example, passivated, before setting down the glass body 6 and bonding said substrate 5 to the glass body 6 to produce an oxide layer containing copper(I) oxide, i.e., containing monovalent copper, on the substrate surface, which, after the pH-selective glass layer 6 has been applied, forms a transition zone in which monovalent copper is present by connecting the substrate 5 to the glass body 6. This transition zone extends into the pH-selective glass layer 6 formed after enamel bonding.

The oxide layer can be produced by the thermal treatment of the surface of the substrate 5, for example, in a flame, by means of a laser or in an oven, in air or under an oxygen-deficient or oxygen-free protective gas atmosphere. Likewise, the oxide layer can be produced by treatment in an oxygen plasma or by coating methods such as sputtering or vapor deposition. For example, the substrate 5 can be heated for passivation to a temperature of 400 to 500° C. in an atmosphere of protective gas, for example, nitrogen, having a low oxygen content. This can take place, for example, in an oven chamber flushed continuously with nitrogen. The thermal treatment of the substrate results in a mixed-valent $CuO_x$ layer containing a high proportion of monovalent copper. If the substrate consists of a copper-based alloy, an oxide layer also forms which contains a high proportion of monovalent copper and which may optionally contain a portion of divalent copper and further oxidized alloy components.

Alternatively or additionally, enamel bonding the glass body made of ion-selective glass to the substrate 5, which simultaneously takes place with enamel bonding the substrate 5 to the insulating glass layer 3 of the base body 2, can be carried out in air or under an oxygen-free or oxygen-deficient protective gas atmosphere in order to influence the proportion of monovalent and divalent copper present in the resulting transition zone between the substrate and the pH-selective glass layer 6 that forms.

Figure 2:
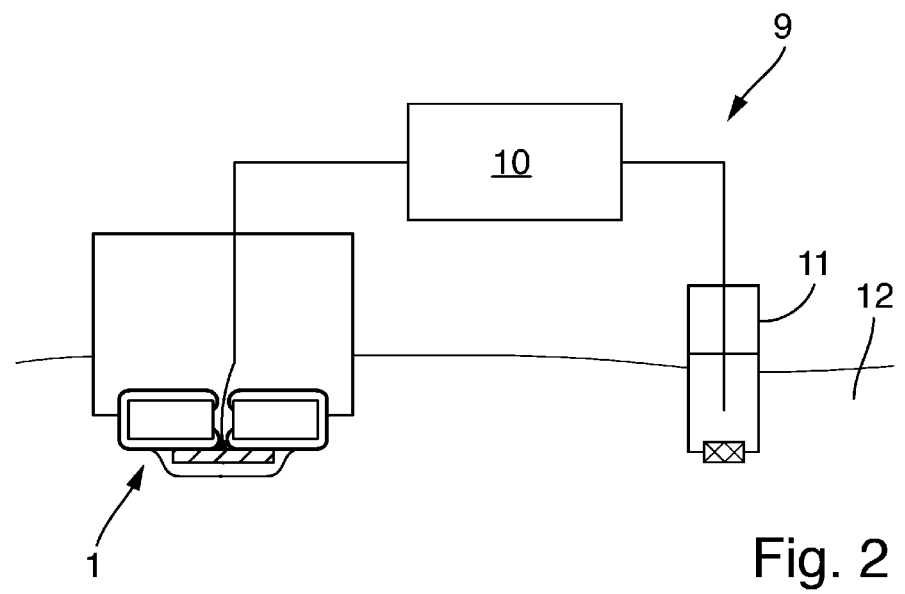
FIG. 2 shows a schematic view of a potentiometric pH sensor having the sensor element according to FIG. 1.

FIG. 2 schematically shows a potentiometric sensor 9 for measuring an activity of an analyte ion or a pH of a measuring liquid 12. The sensor 9 has the sensor element 1 shown in FIG. 1 as the ion-selective or pH-selective measuring electrode. This can be housed in a housing. For the potentiometric measurement of the pH, the sensor 9 also has a reference electrode 11 and a sensor circuit 10. The reference electrode 11 is configured to output a stable reference potential, i.e., a reference potential that is not influenced by the activity of the analyte or the pH value. It can be conventionally designed as silver/silver chloride reference electrode. The sensor circuit 10 is configured to detect a voltage which occurs between the reference electrode 11 and the sensor element 1 when the two are brought into contact with the measuring liquid 12 for measurement purposes. The voltage represents the analyte activity or the pH in the measuring liquid 12. The sensor circuit 10 can also be configured to further process the voltage or a measurement signal derived therefrom, display it and/or output it to a higher-level unit, for example a measuring transducer, a display unit, a control unit or an operating device. The reference electrode 11, the sensor element 1 and the sensor circuit 10 can be combined in a measuring probe.

The invention claimed is:

1. A method for producing a sensor element for a potentiometric sensor, the method comprising:
   forming a glass layer consisting of an electrically insulating glass on a surface of a base body, wherein the base body is made of an electrically insulating material;
   arranging a substrate on the glass layer, wherein the substrate is made of copper or a copper-based alloy having a mass fraction of at least 60% copper;
   covering the substrate arranged on the glass layer with a glass body made of an ion-selective glass, wherein the substrate arranged on the glass layer of the base body and covered with a glass body defines an arrangement; and
   subsequently, controlling a temperature of the arrangement of the base body, substrate and glass body such that the substrate is integrally bonded to the glass body and the glass layer on the surface of the base body.

2. The method according to claim 1, wherein the glass body covering the substrate is a glass plate prior to controlling the temperature.

3. The method according to claim 1, wherein the glass body covering the substrate is made of a pH-selective glass.

4. The method according to claim 1, wherein the base body is made of an electrically insulating ceramic or glass ceramic.

5. The method according to claim 1, wherein the substrate is a foil.

6. The method according to claim 1, further comprising:
   generating an oxide layer on a surface of the substrate, which surface is bonded to the glass body, by a thermal pretreatment process, by a plasma pretreatment process, by an electrochemical or chemical reaction in solution, or by applying the oxide layer by a coating process from the gas phase.

7. The method according to claim 1, wherein, when controlling the temperature, the temperature is greater than 600° C. and lower than 1050° C.

8. The method according to claim 7, wherein, when controlling the temperature, the temperature is greater than 750° C. and lower than 900° C.

9. The method according to claim 1, wherein the base body includes a through-opening which extends from a surface of the base body on which the substrate is arranged to a side of the base body facing away from this surface, the method further comprising:
   electrically contacting the substrate by introducing an electrical conductor into the through-opening.

10. The method according to claim 1, wherein the base body is made of zirconium oxide, yttrium oxide-stabilized zirconium oxide, or aluminum oxide.

11. A sensor element for a potentiometric sensor manufactured according to the method according to claim 1.

12. The sensor element according to claim 11, the sensor element comprising:

the substrate made of copper or a copper-based alloy having a mass fraction of at least 60% copper;

a layer arranged on a first side of the substrate and made of an ion-selective glass; and the base body, wherein the electrically insulating glass layer is arranged on a second side of the substrate facing away from the first side of the substrate, the glass layer adapted as an intermediate layer between the substrate and the base body.

13. The sensor element according to claim 12, wherein the base body is made of an electrically insulating material.

14. The sensor element according to claim 12, wherein the base body is made of an electrically insulating ceramic or an electrically insulating glass ceramic.

15. The sensor element according to claim 14, wherein the base body is made of zirconium oxide, yttrium oxide-stabilized zirconium oxide or aluminum oxide.

16. The sensor element according to claim 12, wherein the substrate is electrically conductively connected to a terminal disposed on a rear side of the base body facing away from the substrate.

17. The sensor element according to claim 12, wherein the substrate is formed from a foil made of copper or the copper-based alloy.

18. The sensor element according to claim 12, wherein the glass body made of the ion-selective glass is doped with $Cu^+$ ions at least in a region of the glass body adjacent to the substrate.

19. The sensor element according to claim 12, wherein the electrically insulating glass layer is made of a pH-insensitive glass.

20. A potentiometric sensor for measuring an ion concentration or a pH of a measuring liquid, the sensor comprising:

a sensor element according to claim 12;

a reference electrode; and a sensor circuit, which is electrically conductively connected to the sensor element and to the reference electrode and which is configured to detect a potential difference between the sensor element and the reference electrode.

* * * * *